Nov. 14, 1950        K. W. GASS        2,529,684
SUPPORT FOR CONVEYER ROLLERS
Filed Dec. 26, 1946
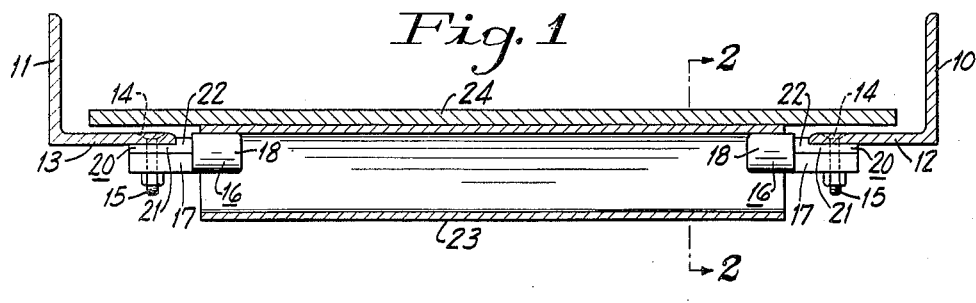
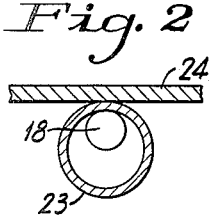
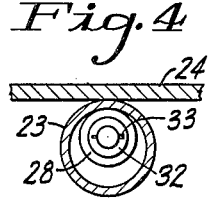
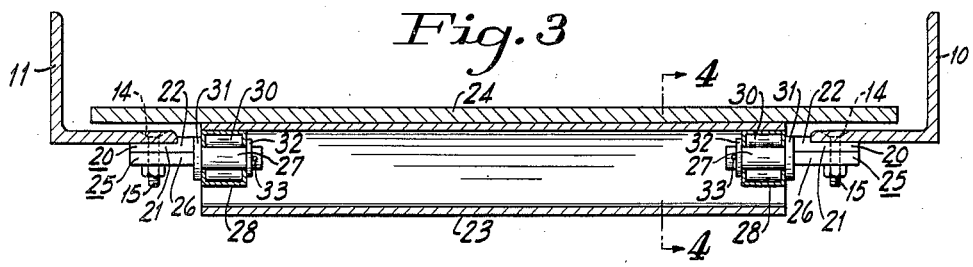
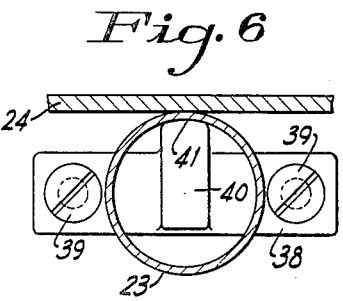
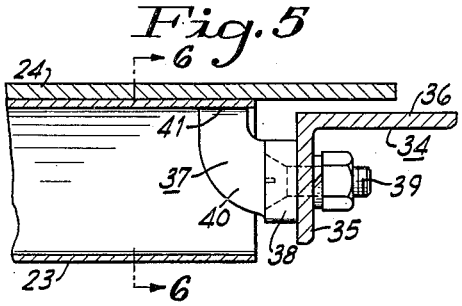

Patented Nov. 14, 1950

2,529,684

UNITED STATES PATENT OFFICE 2,529,684

SUPPORT FOR CONVEYER ROLLERS

Karl W. Gass, Pittsburgh, Pa., assignor to Amsler Morton Corporation, Pittsburgh, Pa., a corporation of Delaware Application December 26, 1946, Serial No. 718,277

1 Claim. (Cl. 198—184)

This invention relates generally to belt conveyors and more particularly to an improved idler conveyor roller structure for supporting the moving belt.

The improved conveyor roller structure comprising this invention may be advantageously employed for supporting conveyor belts particularly such as those subjected to relatively high temperatures when used in continuous glass annealing, heat treating or decorating lehrs, and also in continuous types of metal heat treating furnaces. Such heat resisting conveyor belts are operated at relatively slow speeds and carry relatively light loads.

Roller structures for supporting conveyor belts of this character generally have roller members with hubs mounted on shafts or shaft extensions, and are journaled in closely fitting bearings which must be accurately aligned on the supporting frame to permit free turning of the rollers. However carefully aligned when installed, such bearing structures invariably are forced out of alignment by expansion and warping of the supporting frame due to heat. When misaligned the rollers are no longer free to turn and are subjected to concentrated wear from the moving belt. Such a condition cannot be corrected permanently but only temporarily by shutting down the operation and realigning or replacing the bearings which is an expensive procedure. Another solution of this problem consists of extending the hubs or shafts of the rollers through the walls of the lehr or furnace structure so that the bearings may be mounted on the outside of the structure away from the heat. But this procedure is expensive structurally and inefficient thermally due to heat transmitted outside the structure by the extended shafts and lost to the atmosphere.

The principal object of this invention is the provision of a conveyor roller structure in which the roller is supported in a manner that overcomes the disadvantages of previously used means and is simple and economical to manufacture and maintain.

Another object is the provision of a conveyor roller structure which will not fail due to wear, or due to accumulations of dust.

Another object is to provide a simplified conveyor roller support which does not require lubrication or accurate alignment.

Other objects and advantages will appear in the following description and claim.

A practical embodiment illustrating the principles of this invention is shown in the accompanying drawings wherein:

Fig. 1 is a sectional view of a conveyor roller structure and its support comprising this invention.

Fig. 2 is a sectional view taken on the line 2—2 of Fig. 1.

Fig. 3 is a sectional view of a modified form of the conveyor roller support comprising this invention.

Fig. 4 is a sectional view taken on the line 4—4 of Fig. 3.

Fig. 5 is a sectional view of a modified form of the conveyor roller support comprising this invention.

Fig. 6 is a sectional view taken on the line 6—6 of Fig. 5.

Referring to the drawings, Fig. 1 shows the top flight of the conveyor belt supported by the angle iron frame members 10 and 11 which extend the full length of the conveyor and are arranged to be secured relative to one another and supported in any suitable manner from the floor or within the mechanism with which it operates, such as a lehr, heating furnace, or the like. The inwardly projecting horizontal flanges 12 and 13 of the angle irons 10 and 11 are provided with a series of holes 14 arranged to receive the flat headed machine screw bolts 15. The holes 14 are preferably countersunk for receiving the flat heads of the machine screws 15 so as to leave the upper surface of the inwardly projecting horizontal flanges free and clear of obstructions.

The conveyor roller support member 16 comprises a stem section 17 preferably of rectangular cross section and having a vertically disposed hole adjacent one end thereof for receiving the machine bolt 15. The roller supporting surfaces 18 may be cylindrical as shown in Fig. 2 but they may also be of any other form provided with a top curved surface. The roller supporting surface is preferably formed integral with the stem 17, the longitudinal axis of the stem 17 being eccentrically positioned relative to the axis of the cylindrical portion 18 so that its upper arcuate surface is substantially in alignment with the upper surfaces of the inturned flanges 12 and 13 of the angle irons. The roller supporting surface 18 need not be cylindrical as only the upper arcuate portion is used. Thus only a part of the cylindrical portion having a cross section of that of a sector is required.

If only one bolt is employed to secure the roller support to the frame it is preferable to employ the spacer block 20 to maintain the support in proper alignment. The spacer block provided with a horizontal section 21 which is mounted between the upper surface of the stem 17 and the underside of the flanges 12 or 13 and is provided with an opening through which the bolt 15 passes. The vertically disposed portion 22 of the spacer block is arranged to engage the outer edge of the frame flanges and the transverse end face of the cylindrical portion 18 to hold it in proper alignment but is not permitted to extend above the cylindrical surface 18. If the cylindrical portion 18 is sufficiently large it may be made to engage the edge of the flange on which it is mounted to maintain its alignment without the use of the spacer block 20.

The conveyor roller member 23 is a cylinder, either hollow throughout its length as shown or solid with hollow sections at both ends to admit the supporting members 18. The inner diameter of the roller 23 should be materially greater than the diameter of the cylindrical portion 18 and is telescoped over oppositely disposed conveyor roller support members as shown. The length of the conveyor roller 23 is preferably slightly less than the distance between the frames 10 and 11 and the conveyor roller 23 is free to move laterally and engage the edge of either inturned flange 12 or 13 as the cylindrical portion 18 of the roller support members provides ample longitudinal support.

Although the cylindrical portion 18 is stationary, the conveyor roller 23 is permitted to rotate thereon when driven through a frictional engagement by an object or by the conveyor belt 24. When the conveyor roller 23 rotates it slides over the smaller cylindrical surfaces 18 on which it has a linear contact and the bore of the conveyor roller 23 becomes polished where it engages the cylindrical surfaces 18 thereby reducing the friction therebetween. Upon initial movement the conveyor roller 23 may tend to climb or pivot and swing changing the position of its lineal contact with the cylindrical surfaces 18 but it will continue to freely rotate with ease after overcoming the initial friction. The cylindrical supporting surfaces 18 are preferably made of a very hard and highly polished steel so as to provide long life and assume all wear on the inner surface of the conveyor roller 23 which may be readily replaced by removing one of the roller support members 16 and inserting another tubular roller thereon. A roller of this character will function if misaligned and it may operate without lubrication.

In the modified structure shown in Figs. 3 and 4 the roller support member 25 has a stem 26 of rectangular cross section similar to that of the stem 17 previously described. The other end of the stem 26 is provided with the stub shaft 27 arranged to carry the antifriction bearing 28 containing a complement of roller bearings 30. The antifrictional bearing 28 may have an outer and inner race and is held against the shoulder 31 on the shaft 27 by means of the washer 32 which is retained by the cotter key 33 passing through the shaft 27. This manner of supporting the conveyor rollers materially simplifies renewal of the parts. These bearings may be of any standard antifrictional bearing of the roller or ball type and they do not require lubrication. The bore of the conveyor rollers 23 are materially larger in diameter than the bearings 28 and are arranged to be supported thereon in the same manner as that described with reference to Figs. 1 and 2. With this structure the friction between the roller support member and the conveyor roller 23 is materially reduced and the ends of its bore will become polished but not to the same degree as that occurring between the roller and the stationary cylindrical support 18.

These bearings require no lubrication and have additional advantages for use in lehrs or furnaces wherein the belt load is greater than that ordinarily required.

In the modification shown in Figs. 5 and 6, the angle iron conveyor frame 34 is turned with its flanges 35 and 36 extending downwardly and outwardly respectively to permit the conveyor belt 24 to be positioned at a lower elevation within the lehr or metal heat treating furnace. The tubular roller 23 is supported at its ends on the bearing brackets 37 in a similar manner as that shown in Figs. 1 and 2. The bearing bracket is provided with the base plate 38 having spaced holes to receive the bolts 39 which secure the plate 38 to the face of the flange 35. The base plate 38 is provided with an outwardly and upwardly extending arm 40 the top of which is arcuately formed as indicated at 41 to provide a bearing surface arranged to engage in the end of the bore of the conveyor roller 23 and support the same for rotation.

By providing tubular conveyor rollers of the character wherein the bore is materially greater in diameter than its arcuate support, an economical and lasting conveyor roller structure may be had which does not require lubrication and relative motion is provided between the conveyor belt and the conveyor rollers between the conveyor rollers and their supports. The conveyor roller supports may be cast or otherwise formed and are readily replaced with very little loss in time or cost of materials.

I claim:

A conveyor belt support comprising spaced frame members, a parallel series of oppositely disposed pairs of brackets mounted on said frame members to project toward each other, each bracket having an upwardly facing arcuate bearing surface integral with its outer end, a roller for each pair of said brackets, a cavity in each end of each roller to provide an inner annular bearing surface that is larger than and extends over the bracket, the inner annular bearing surfaces of the roller cavities riding on and moving relative to the integral arcuate bearing surfaces on the brackets.

KARL W. GASS.

REFERENCES CITED

The following references are of record in the file of this patent:

UNITED STATES PATENTS

| Number | Name | Date |
| --- | --- | --- |
| 1,219,901 | Alvey | Mar. 20, 1917 |
| 1,414,429 | Madorin | May 8, 1922 |
| 1,455,977 | Wentz | May 22, 1923 |

FOREIGN PATENTS

| Number | Country | Date |
| --- | --- | --- |
| 248,032 | Germany | June 11, 1912 |
| 622,263 | France | Feb. 21, 1927 |